US010025365B2

(12) United States Patent
Banerjee et al.

(10) Patent No.: US 10,025,365 B2
(45) Date of Patent: Jul. 17, 2018

(54) POWER COURSES BASED ON CURRENT CHANGES

(71) Applicant: Hewlett Packard Enterprise Development LP, Houston, TX (US)

(72) Inventors: Abhishek Banerjee, Houston, TX (US); James W. Hollas, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 219 days.

(21) Appl. No.: 15/190,748

(22) Filed: Jun. 23, 2016

(65) Prior Publication Data
US 2017/0371392 A1 Dec. 28, 2017

(51) Int. Cl.
*G06F 1/00* (2006.01)
*G06F 1/26* (2006.01)
*G06F 1/32* (2006.01)
*G06F 1/30* (2006.01)
*H02M 7/44* (2006.01)
*H02M 1/32* (2007.01)

(52) U.S. Cl.
CPC .............. *G06F 1/305* (2013.01); *H02M 1/32* (2013.01); *H02M 7/44* (2013.01)

(58) Field of Classification Search
CPC ....................................... G06F 1/305
See application file for complete search history.

(56) References Cited

U.S. PATENT DOCUMENTS

| 8,159,362 | B2 | 4/2012 | Swartzendruber et al. | |
|---|---|---|---|---|
| 2007/0233408 | A1* | 10/2007 | Ho | G06F 17/5036 |
| | | | | 702/66 |
| 2007/0247774 | A1* | 10/2007 | Cheng | H02H 1/04 |
| | | | | 361/93.1 |
| 2011/0301771 | A1* | 12/2011 | Whittam | G06F 1/28 |
| | | | | 700/293 |
| 2012/0063045 | A1 | 3/2012 | Shearon | |
| 2014/0003830 | A1* | 1/2014 | Higashi | G03G 15/5004 |
| | | | | 399/69 |
| 2014/0359190 | A1* | 12/2014 | Metzner | G06F 11/3027 |
| | | | | 710/306 |
| 2015/0107934 | A1 | 4/2015 | Morino | |
| 2017/0075408 | A1* | 3/2017 | Banerjee | G06F 1/3287 |

FOREIGN PATENT DOCUMENTS

EP 0648004 A2 4/1995

OTHER PUBLICATIONS

Always On, UPS Systems Canada Inc., Genie Smart Panel, (Web Page), http://www.alwayson.com/genie.html, 2014, 1 Page.

* cited by examiner

*Primary Examiner* — Mohammed Rehman
(74) *Attorney, Agent, or Firm* — Hewlett Packard Enterprise Patent Department

(57) ABSTRACT

Examples described herein include receiving current values of a power device, determining a spike situation of the power device, determining a power course for the power device, and operating the power device according to the power course. The current values may include a first current value at a first time and a second current value at a second time. The power course may be determined based on a plurality of current change values associated with the spike situation, a total number of spikes associated with the spike situation, and a duration of at least one spike out of the total number of spikes associated with the spike situation.

20 Claims, 8 Drawing Sheets

POWER COURSES BASED ON CURRENT CHANGES

BACKGROUND

A data center may have racks utilizing DC input power. However, there may be devices housed in DC powered racks that do not take DC input (e.g., network switch, etc.). Thus, a rack in a data center may also include a DC/AC inverter to convert the initial DC input into an AC output.

BRIEF DESCRIPTION OF THE DRAWINGS

The following detailed description references the drawings, wherein.

DETAILED DESCRIPTION

Figure 1:
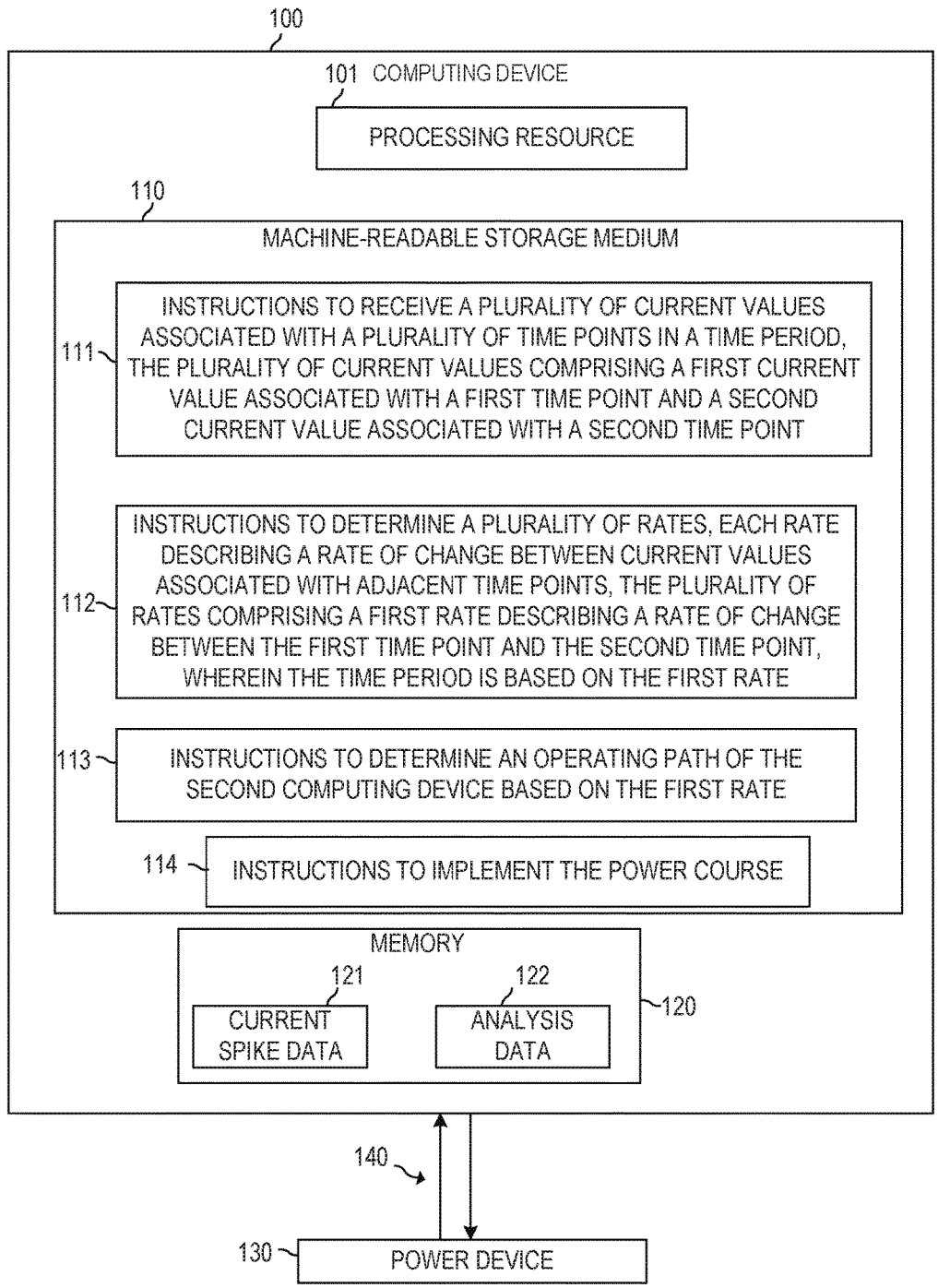
FIG. 1 is a block diagram of a computing device to determine a power course based on rates of change of current values detected within a certain time period, according to some examples.

In some situations, the inverter may have protective mechanisms to ensure that a short circuit or overcurrent does not occur in the inverter. These protective mechanisms may include powering off the inverter when a short circuit or an overcurrent situation is detected. However, in some situations, these protective mechanisms may mistake a normal operating situation for a short circuit or overcurrent situation.

The service capacity of a rack may be expanded by adding additional devices (e.g., servers, switches, etc.) to meet the demands of a data center. In some situations, the additional device may be added to the rack, and connected to the power supply, without first powering down the rack. This may be done to avoid disrupting accessibility to existing devices on the rack and is known as hot plugging a device. The hot plugging of an additional device to the inverter may cause an inrush of current that is misread by the protective mechanism of the inverter as a short circuit situation, leading to a shutdown of the inverter. Thus, in many situations, the shutdown causes unnecessary service disruptions.

Examples discussed herein addresses these technological challenges by providing a way to detect current spike situations and determine if the spike in current is due to a short circuit or a hot-plug of a device. In some examples, the current value associated with a power device is tracked over time to establish a current spike situation. When a current spike situation occurs, examples discussed herein may determine rates of current change over time to determine a length of time to continue tracking the change in current value. Examples discussed herein may also determine an appropriate power path for a power device by analyzing the rate of the current change over time, the number of current spikes in the current spike situation, and the duration of the current spikes. Thus, examples discussed herein may allow devices to be hot plugged into an inverter without causing a nuisance shut down of the inverter. Examples discussed herein also allow for increased reliability of the inverter and protection of the inverter of short circuits.

In some examples, a method is provided including receiving current values of a power device, determining a spike situation of the power device, determining a power course for the power device, and implement the power course. The current values that are detected may include a first current value at a first time and a second current value at a second time. The determination of the power course may be based on a plurality of current change values associated with the spike situation, a total number of spikes associated with the spike situation, and a duration of at least one spike out of the total number of spikes associated with the spike situation.

In some examples, a computing device includes a non-transitory machine-readable storage medium with instructions. The instructions are executable by a processing resource to receive a plurality of current values associated with a plurality of time points in a time period. The plurality of current values may include a first current value that is associated with a first time period and a second current value associated with a second time period that is subsequent to the first time point. The current values are associated with a power device. The instructions are also executable by the processing resource to determine a plurality of rates, each rate describing a rate of change between current values associated with adjacent time points. The plurality of rates may include a first rate describing a rate of change between the first current value and the second current value. The time period in which to detect the plurality of current values may be determined based on the first rate. The instructions are also executable to determine a power course of the power device based on the first rate, and to operate the power device according to the power course.

In some examples, a computing device includes a current detection engine, an analysis engine, a decision engine, and an execution engine. The current detection engine is to detect a spike situation of the computing device. The analysis engine is to determine at least one current change value describing a rate of change of the spike situation, determine a total number of current spikes in the spike situation, and determine a duration of at least one spike out of the total number of spikes. The decision engine is to determine a current condition based on the at least one current change value, the total number of spikes, and the duration of at least one spike. The execution engine is to power off the computing device based on the determination of the current condition.

Referring now to the figures, FIG. 1 is a block diagram of an example computing device 100 to determine a power course of power device 130. As used herein, a "computing device" may be a server, computer networking device, chip set, desktop computer, workstation, or any other processing device or equipment. As used herein, a "power device" may include a device or equipment that supplies and/or converts power (e.g., an inverter).

Computing device 100 of FIG. 1 includes processing resource 101 and a storage medium 110. Storage medium 110 may be in the form of non-transitory machine-readable medium, such as suitable electronic, magnetic, optical, or other physical storage apparatus to contain or store information such as instructions 111, 112, 113, and 114, related data, and the like.

As used herein, "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or combination thereof. In some examples, a storage medium can correspond to a memory including a main memory, such as a Random Access Memory (RAM), where software may reside during runtime, and a secondary memory. The secondary memory can, for example, include a nonvolatile memory where a copy of software or other data is stored.

In the example of FIG. 1, instructions 111, 112, 113, and 114 are stored (e.g., encoded) on machine-readable storage medium 110 and are executable by processing resource 101 to implement functionalities described herein in relation to FIG. 1. In some examples, machine-readable storage medium 101 may include additional instructions, for example, the instructions to implement some of the functionalities described in relation to FIGS. 3, 4, 5 and FIGS. 6A-6B. In some examples, instructions 111-114 and any other instructions described herein in relation to machine-readable storage medium 110 may be stored on a machine-readable storage medium remote from but accessible to computing device 100 and processing resource 101. In other examples, the functionalities of any of the instructions of machine-readable storage medium 110 may be implemented in the form of electronic circuitry, in the form of executable instructions encoded on machine-readable storage medium, or a combination thereof.

Processing resource 101 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processor can be functional to fetch, decode, and execute instructions 111, 112, 113, and 114 as described herein.

Instructions 111 may be executable by processing resource 101 such that computing device 100 is receives a plurality of current values that are associated with power device 130. The plurality of current values may be associated with a plurality of time points. In some examples, the plurality of current values may include a first current value associated with a first time point and a second current value associated with a second time point.

In some examples, power device 130 is a device that supplies a current output (e.g., an inverter, etc.) to a third device (e.g., a switch, solid-state drive, etc.) that is not shown in FIG. 1. In those examples, power device 130 may have a current detector that detects the value of the current output of power device 130 over the specific time period. Some non-limiting examples of a current detector may include a current transformer, current sense resistor, etc. In some examples, power device 130 may detect a current at even intervals during the specific time period (e.g., every 2 microseconds, etc.). In other examples, power device 130 may detect a current value at specific time points during the specific time period (e.g., at the first microsecond, at the third microsecond, at the fourth microsecond, etc.). In some examples, computing device 100 may communicate to power device 130 through a communications network, as represented by arrows 140.

In some examples, communication network 140 may be a wireless network, a wired network, or a combination thereof. In some examples, network 140 may be an individual network or a collection of many such individual networks interconnected with each other and functioning as a single large network (e.g., the Internet or an intranet). In some examples, communication network 140 may be implemented as a local area network (LAN), wide area network (WAN), etc. In other examples, computing device 100 may be directly connected to power device 130.

In some examples, power device 130 may be a device that supplies an alternating current output. In those examples, power device 130 may supply a both a positive current output and a negative current output. Thus, in those examples, instructions 111 may include instructions to determine absolute values of the received current values. In some examples, power device 130 may be a high voltage inverter that may handle at least 3000 Watts (e.g., 5000 Watts, etc.)

Computing device 100 also comprises memory 120 to store current spike data 121 and analysis data 122. Current spike data 121 may include the current values received by instructions 111. Current spike data may include the absolute values of the current values, as determined by instructions 111. Analysis data 122 may include any or all of the determinations and computations made by instructions 112, as discussed herein.

Memory 120 may be separate from machine-readable storage medium 110 storing instructions 111-114 or may be implemented by machine-readable storage medium 110. In some examples, memory 120 comprises a secondary memory portion as discussed above. In other examples, memory 120 may be implemented by instantaneous flash memory that is cleared after a power cycle of power device 130. Processing resource 101 is in communication with memory 120. While memory 120 is shown in example of FIG. 1 as being housed in computing device 100, in other examples, memory 120 may be separate from computing device 100 but accessible to processing resource 101 of computing device 100.

Instructions 111 may be executable by processing resource such that computing device 100 is able to determine a current spike situation associated with power device. As used herein, a current spike situation is when the current output of a device is not at a value that the device normally operates at. Thus, a current spike situation may include one spike (e.g., FIG. 2A, etc.). Additionally, a current spike situation may include multiple spikes (e.g., FIG. 2B, etc.). In some examples, instructions 111 may include instructions to compare a received current to a baseline operational current of power device 130 and determine the occurrence of a spike situation when a current is higher than the operational current. In some examples, the baseline operational current of power device 130 varies depending on the loads connected to power device 130.

Instructions 112 may be executable by processing resource 101 such that computing device 100 is determines a plurality of rates of associated with the current spike situation of power device 130. Thus, each rate describes a rate of change between the current value at one time point and the current vale at another time point. For example, power device 130 may output a current of 4 amps at a time point of 3 microseconds (relative to a starting point of time point of 0 microseconds) and output a current of 5 amps at a time point of 5 microseconds (relative to the same time starting point). Instructions 112 may determine from those current readings that a rate associated with power device 130 is 1 amp/microsecond. This may be determined by calculating the change of current and dividing it by the change in time between time point 5 microsecond and time point 3 microsecond. In some examples, this may also be characterized as $$\Delta i/\Delta t$$

where i represents current (e.g., in amps), t represents time (e.g., in microseconds or milliseconds, etc.), and $\Delta$ represents the change in the variables.

In examples where power device 130 supplies an alternating current, instructions 112 may determine the plurality of rates from the absolute values of the received current values.

In some examples, each rate may describe a rate of current change between current values associated with time points that are adjacent to each other. Thus, for example, if power device 130 is configured to detect a current value at every microsecond over four microseconds, instructions 111 may receive four current values: a first current value for time point 1 microsecond, a second current value for time point 2 microsecond, a third current value for time point 3 microsecond, and a fourth current value for time point 4 microsecond. A rate of current change that describes the rate of change between current values associated with sequential time points may be a rate of change describing a rate of change between time points 1 microsecond and 2 microsecond, between time points 2 microsecond and 3 microsecond, or between time points 3 microsecond and 4 microsecond. In some examples, instructions 112 may determine at least one rate of change (e.g., all three rates, two rates, etc.) for all of the current values received. In some examples instructions may determine rates between all time periods (i.e. three rates.).

In some examples, the specific time during which the plurality of current values are received by instructions 111 is based, at least in part, on the rates determined by instructions 112. In other words, the value of the rates may vary the specific time period for which current values are received.

Figure 2A:
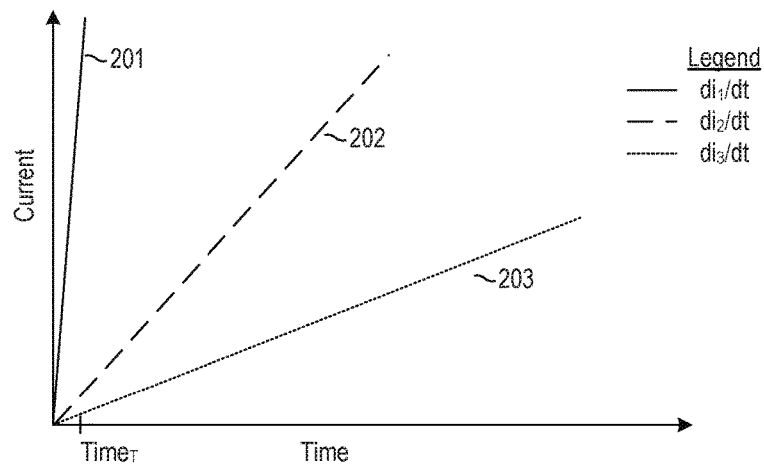
FIG. 2A is a diagram showing the effect of the rate of change on the length of the time period, according to some examples.

FIG. 2A is a diagram showing different current spike situations and how the rate may influence the specific time period for which current values are received. Lines 201, 202, and 203 represent different current spike situations that may occur in power device 130. The vertical axis of FIG. 2A may not start at a point where the current is 0, but may start at a baseline operating current of power device 130. Line 201 represents an example of a short circuit situation. In a short circuit situation, the current travels through an unintended path. Often times, the unintended path has a very low electrical impedance, allowing the current in a device to rise rapidly over a short time. This is represented by line 201 being close to a vertical line. Line 202 represents an example of an over current situation, with the current rising slower than 201. Line 203 represents an example of an inrush current situation, with the current rising slower than both 201 and 202. The lines and shapes of the lines shown in FIG. 2A are for explanation purposes and are not restrictive.

Thus, in a short circuit situation as shown by line 201, the current may escalate very quickly, allowing less time to perform a protective mechanism on power device 130. Thus, the specific time period for which current values are received by computing device 100 may be based on the rates of change and more specifically, the first rate after a current spike situation is determined. The first rate determined by instructions 112 after a current situation is determined may describe the change between a first detected current value at a first time point and a second detected current value at a second time point. The first current value may be equal to the baseline operating current of the device. The second current value may be higher than the baseline operating current of the device.

Instructions 113 may be executable by processing resource 101 such that computing device 110 determines a power course based a rate. As used herein, a "power course" is a decision that relates to the power supplied to a device. This may include a decision to immediately turn off the device, a decision to continue to operate the device without any changes, a decision to delay turning off the device until a further time, etc.

In some examples, instructions 113 may include instructions to compare the first rate to a threshold rate. This threshold rate may represent a value that characterizes a short circuit situation in power device 130. In some examples, this value is dependent on power device 130 and its loads. In some examples, this threshold may be in the range of the hundredths of amps per microseconds. In some examples, the threshold rate may be similar to the linear slope of line 201.

When the first rate is equal to or higher than the threshold rate (e.g., the linear slope of line 201), instructions 113 may include instructions to determine if a time between the first time point and the second time point is equal to or higher than a threshold time. Instructions 113 may determine that a short circuit has occurred based on the first rate equaling or exceeding the threshold rate and the time period between the first time point and the second time point equaling or exceeding the threshold time (represented by Time$_T$ in FIG. 2A). In some examples, the threshold time may be ten microseconds. Thus, responsive to a determination that the first rate and subsequent rates are higher than the threshold rate and the total time elapsed during those time points is equal to ten microseconds, 113 may determine a power course of powering off the power device, Instructions 113 may determine that a short circuit is not present when it determines that the time between the first time point and the second time point is not equal to or higher than the threshold time. Accordingly, instructions 113 may determine a power course of delaying a shutdown of power device and allowing for more current detection. Accordingly, the time period for instructions 111 to receive a plurality of current values is extended. Thus, instructions 111 may allow computing device 100 to receive a subsequent current values associated with subsequent time points based on the rates determined by 112.

For example, instructions 111 may allow computing device to receive a third current value associated with a third time point that is subsequent to the second time point discussed above. Instructions 112 may allow computing device 100 to determine a second rate describing a rate of change between the third time point and the second time point. If the second rate is equal to or higher than the threshold rate (e.g., linear slope of line 201, etc.), instructions 113 may determine if the time period elapsed between the third time point and the first time point is higher than the threshold time. Responsive to a determination that the time period elapsed between the third time point and the first time point is higher than the threshold time, instructions 113 may determine a power course to shut off the power device 130 based on the first rate and the second rate meeting a rate threshold. Thus, the specific time period for which current values are received by 111 may be longer when the first rate of change is not equal to or higher than the threshold rate.

In some examples, instructions 113 may determine a power course of a current spike situation based on the plurality of rates, including the rates themselves and other data that may be determined from those rates, as will be described below. Thus, in some examples, instructions 113 may be executable by processing resource 101 such that computing device 110 is determines a power course of the computing device based on at least one of: 1) the rates; 2) the total number of spikes in a spike situation; and 3) a duration of at least one of those spikes. This is because current spike situations may include many spikes, each with different characteristics.

Figure 2B:
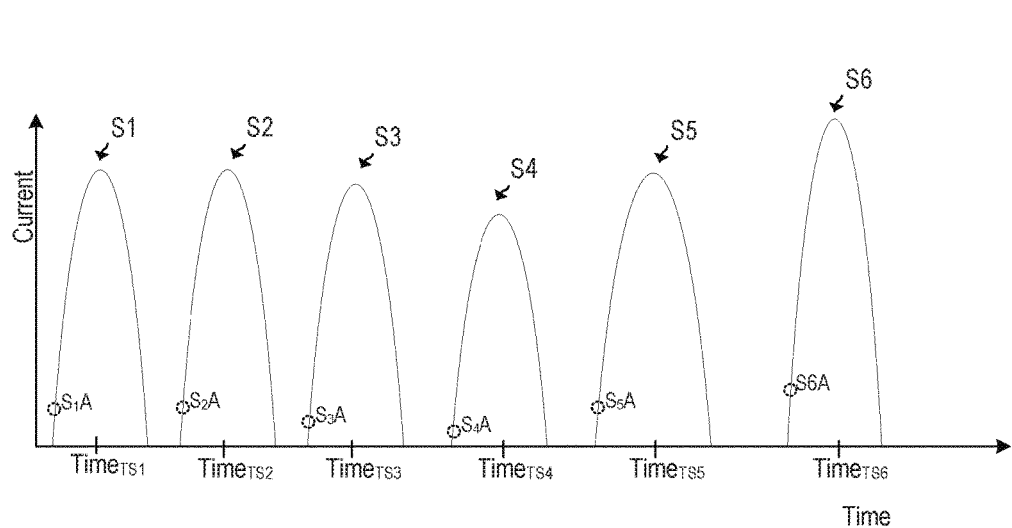
FIG. 2B is a diagram of current changes over time and the determination of the current condition using values determined from the current changes, according to some examples.

For example, FIG. 2B shows a current spike situation 204 in power device 130 with many current spikes S1-S6, not just one linear increasing spikes like 201, 202, 203 shown in FIG. 2A. FIG. 2B may represent the absolute values of current values outputted from an inverter.

Thus, instructions 112 may allow computing device 100 to determine the number of current spikes in current spike situation 204. Additionally, each current spike S1-S6 may have a unique duration. Thus, in some examples, instructions 112 may allow computing device 100 to determine the duration of at least one of spikes S1, S2, S3, S4, S5, or S6 in the current spike situation 204. Instructions 113 may allow computing device to use these determinations to determine a power course for power device 130.

Figure 2C:
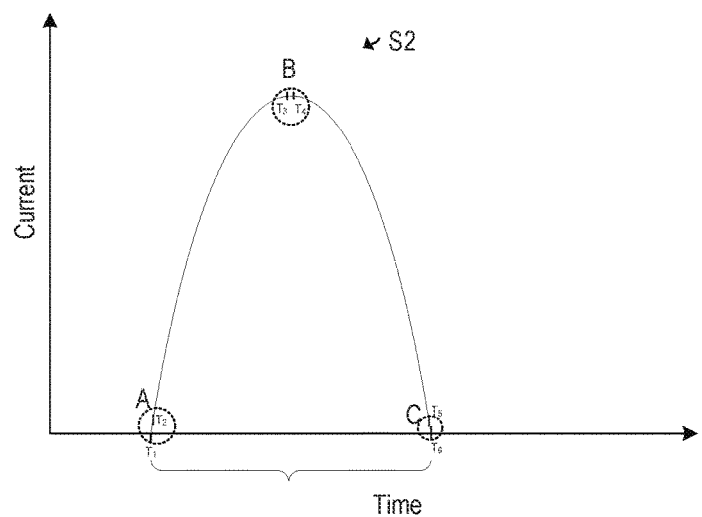
FIG. 2C is a diagram of change of current values over time, according to some examples.

FIG. 2C is a detailed view of spike S2 in FIG. 2B. Spikes S1, S3, S4, S5, and S6 are not shown in FIG. 2C for simplicity. In some examples, instructions 112 may determine the total number of spikes in current spike situation 204, by keeping a count for all instances of when a rate between current values of adjacent time points is equal to zero. This information may be stored in analysis data 122 in memory 120 of computing device 100. Thus, at location B in spike S2, instructions 111 may receive a current value associated with time $T_3$ and a current value associated with time $T_4$. Instructions 112 may determine that the rate between the current value at time $T_4$ and the current value at time $T_3$ is zero. With this determination, instructions 112 interfaces with analysis data 122 of computing device 100 to reflect that there is at least one spike associated with spike situation 204. In some examples, instructions 112 may also include instructions to track if a particular spike has already had a rate of zero in the past. As discussed below in relation to 623 of method 600, this may allow computing device 100 to accurately reflect the number of spikes in a spike situation.

Instructions 112 may also determine a duration of spike S2 by determining the amount of time elapsed from time $T_1$ at point A (e.g., the beginning of spike S2) to time $T_6$ at point C (the end of spike S2). At point A, instructions 111 may receive a current value at time $T_1$ and a current value at time $T_2$. From those current values, instructions 112 may determine that there is a spike S2 by comparing either the current value at time $T_1$ or the current value at time $T_2$ to an operational current value of the power device 130. In the example shown in FIG. 2C, the operational current value of the power device 130 is the current value at time $T_1$. Because time $T_1$ is the last time point before time $T_2$ where the current value is equal or lower than the threshold operational value, instructions 112 determines that time $T_1$ is the starting point of spike S2.

In other examples, not shown in FIG. 2C, the current value at time $T_1$ may also be higher than the operational current value. In these examples, instructions 112 may determine the starting point of the spike by determining the last time point prior to time $T_1$ at which the current value was at the operational current value and use this prior time point as the starting point of spike S2.

Instructions 112 may also determine an ending point of spike S2. Thus, instructions 112 may include instructions to determine a time point occurring after a rate is negative when a received current value is at an operational current value of power device 130. From the ending point of spike S2 ($T_6$) and the beginning point of spike S2 ($T_1$), instructions may determine a duration of spike S2. The duration may be stored in analysis data 122 in a manner that associates the duration to the spike S2.

Instructions 112 may include instructions to determine a maximum current value of spike S2. In some examples, this includes instructions to determine the current value at the time point where the rate of change is zero. In examples where power device 130 supplies an alternating current output, the absolute value of the current value at the time point where the rate of change is zero is the maximum current.

Depending on the specific current spike situation, some characteristics may be present while others are not. For example, a current spike situation of power device 130 may resemble line 201 in FIG. 2A. In these examples, instructions 113 may determine that a rate is above the rate threshold as well as the time at which the rate remains the same or is higher than the rate threshold to be above a threshold time. This may indicate a short circuit. Based on this, instructions 113 may determine a power course of shutting of power device 130.

In some examples, a spike situation of power device 130 may look like current spike situation 204 as shown in FIG. 2B. The vertical axis of FIG. 2B may not start at a point where the current is 0, but may start at a baseline operating current of power device 130.

Instructions 113 may determine, based on the determinations of instructions 112, that in spike S1, up to point $S_1A$, the rates determined by instructions 112 are above the threshold rate, as discussed above. However, instructions 113 may determine that the rates after point $S_1A$ are below the threshold rate. Because the rates are not equal or greater than the threshold rate for the threshold time period (e.g. Time$_{TS1}$), instructions 113 do not determine a short circuit condition and does not decide a power course as is similar with 201. With the beginning of spike S1, instructions 113 may determine a power course of delaying shut down of power device 130. Thus, instructions 111 continue to receive current values and instructions 112 continue to determine the plurality of rates as discussed above. After spike S1 has ended, instructions 112 also computes S1's maximum current, and spike duration, as discussed above.

Based on S1's maximum current and spike duration, instructions 113 may determine a power course. For example, instructions 113 may determine, based on spike S1, that spike S1 may be an inrush current from a hot plug situation. It may determine a power course of continuing operation of computing device without any changes at the time point when S1 is over.

The current output of power device 130 may return to operational current for a period after spike S1. However, spike S2 may occur a short time after spike S1. Instructions 113 may now look at the same characteristics of spike S2 as it did for spike S1. For example, while the rate of change for spike S2 may be above the threshold rate up to point $S_2A$, the threshold rate was not present for the threshold time period $Timer_{TS2}$. Thus, instructions 111 continues to receive current values and instructions 112 continue to determine the plurality of rates as discussed above. After spike S2 has finished, instructions 112 may determine spike S2's maximum current, and spike duration, as discussed above. Additionally, instructions 112 may increment a spike count total to two. Instructions 113 may take account the characteristics of spike S1 as well as the characteristics of spike S2 in its determination. Instructions 113 may determine that based on the values for spike S1 and spike S2 that an appropriate power course would be to continue operation of power device 130. The analysis used for spikes S1 and S2 may also be applied to spikes S3, 54, and S5.

By the time spike S6 occurs in current spike situation 204, instructions 113 may determine a power course based upon the characteristics of S6, and the characteristics of S1, S2, S3, S4, and S5. For example, instructions 113 may determine that the combination of S1, S2, S3, S4, S5, and 86 indicate a circuitry problem in power device 130 because of the similarity of spikes S1, S2, S3, S4, S5, and S6 (e.g., having overall similar duration, and similar maximum values, etc.). Additionally, instructions 113 may determine the power course based on trends of in the current spike situation 204. For example, the trend of spikes S4, S5, and S6 showing increase in maximum current.

Thus, in some situations, while the characteristics of spikes S1, S2, S3, S4, S5, and S6 individually may not cause instructions 113 to determine a power course of shutting off power device 130, the combination of the characteristics of spikes S1 S2, S3, S4, S5, and S6 may do so.

Figure 2D:
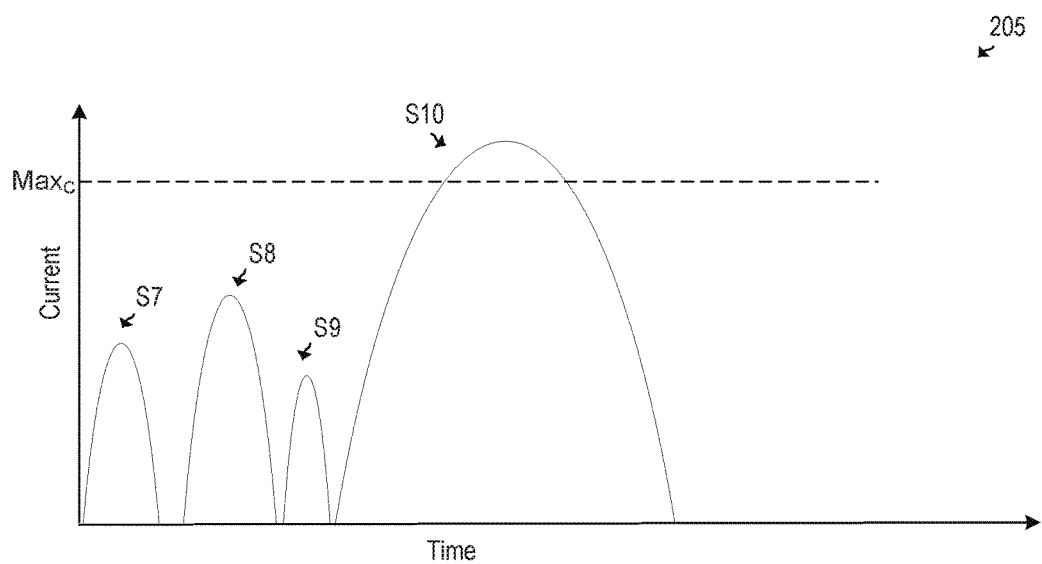
FIG. 2D is a diagram of change of current values over time, according to some examples.

In some examples, a spike situation of power device 130 may look like current spike situation 205 as shown in FIG. 2D comprised of spikes S7, S8, S9, and S10. The vertical axis of FIG. 2D may not start at a point where the current is 0, but may start at a baseline operating current of power device 130. Instructions 113 may determine from the characteristics of spikes S7, S8, and S9 that a power course may be to continue operations without any changes. However, with spike S10, instructions 113 may determine that the maximum current of spike S10 is over a threshold current MaxC that is in the operating specification of power device 130. Thus, instructions 113 may determine a power course to turn off power device 130.

Figure 2E:
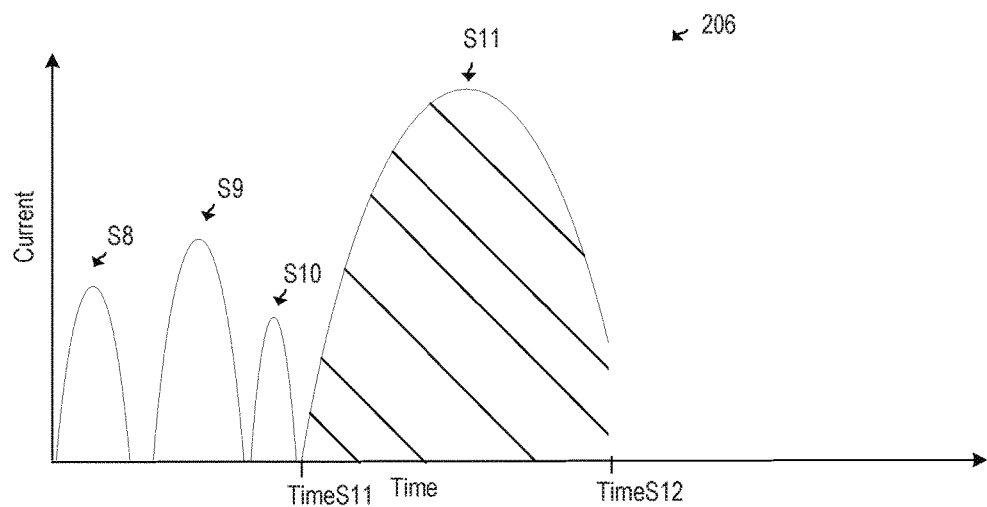
FIG. 2E is a diagram of change of current values over time, according to some examples.

In some examples, a spike situation of power device 130 may look like current spike situation 205 as shown in FIG. 2E comprised of spikes S7, S8, S9, and S11. The vertical axis of FIG. 2E may not start at a point where the current is 0, but may start at a baseline operating current of power device 130. Instructions 113 may determine from the characteristics of spikes S7, S8, and S9 that a power course may be to continue operations without any changes. However, with spike S10, instructions 113 may determine that a duration of spike S11 is too long. This is because, in some examples, power device 130 may supply a limited amount of charge.

In some examples, instructions 112 allows computing device 100 to determine not just the entire duration of a spike after the spike has occurred, but the current duration of a spike that is still occurring. In some examples, instructions 112 includes instructions to increment the time since the beginning of a spike to determine the current duration of an on-going spike. Thus, at TimeS12, although spike S11 has not finished coming down to operating current, instructions 112 determines that it has lasted at least from time S11 to timeS12. Instructions 113 is able to determine at TimeS12 a power course for power device 130 of shutting down the power device 130 due to an over-exertion of the charge required of power device 130 by spike S11 (represented by the shaded area in FIG. 2D).

Instructions 114 may be executable by processing resource 101 such that computing device 100 executes the power course. In some examples, this may include instructions to interface with a power supply device (not shown) of the power device 130 such that an electrical connection between the power device 130 and the power supply device is disrupted. In some examples, this may include instructions to communicate to the power device 130 to ignore the current spike situation (e.g., when instructions 113 determines that the spike is caused by an inrush current). In some examples, this may include instructions to trigger circuitry in the power device 130 to shut off power device 130.

Figure 3:
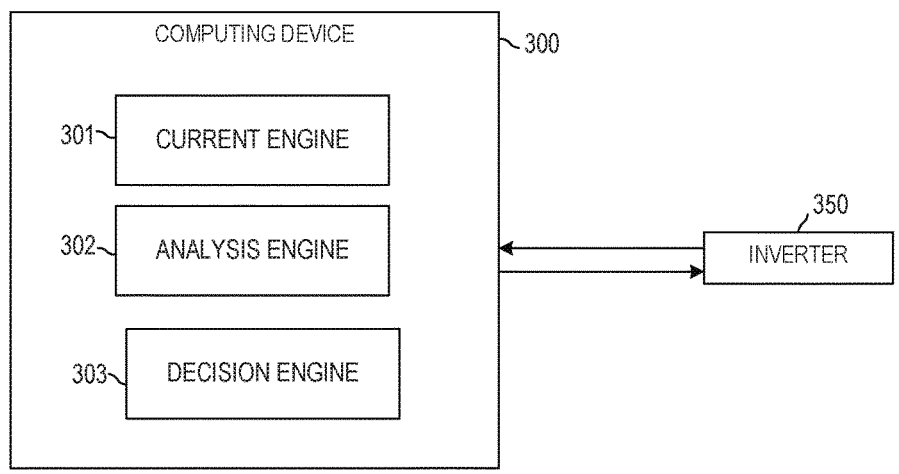
FIG. 3 is a block diagram of a computing device to determine a current condition of an inverter, according to some examples.
Figure 4:
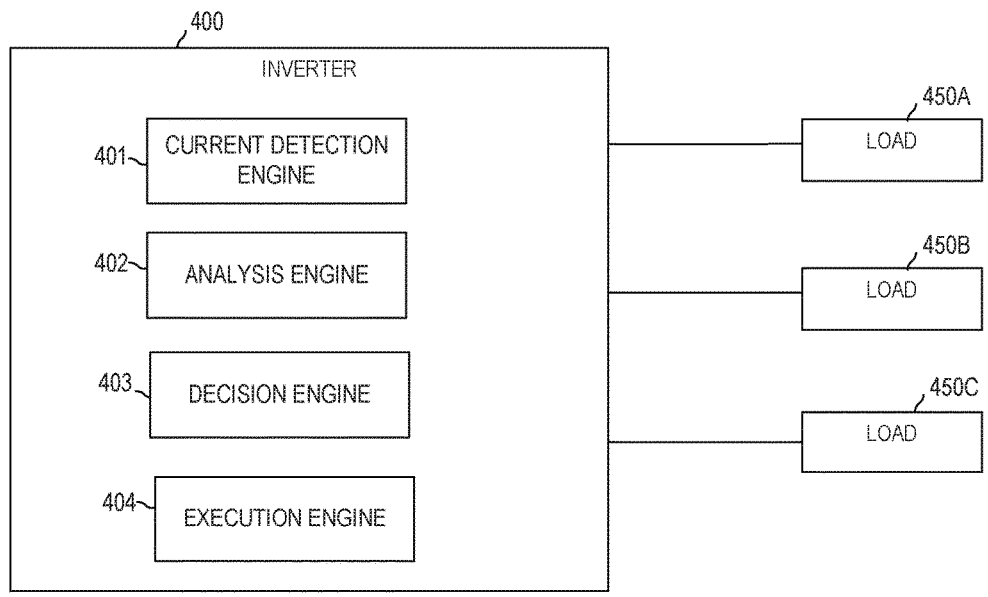
FIG. 4 is a block diagram of an inverter interfacing with multiple loads, according to some examples.

Computing device 100, which is described in terms of processors and machine-readable storage mediums, may include one or more structural or functional aspects of computing device 300 of FIG. 3 or computing device 400 of FIG. 4, which are described in terms of functional engines containing hardware and software. Additionally, while computing device 100 is shown as a separate computing device interfacing with power device 130 in the example of FIG. 1, in other examples, one device may perform all of the functionalities described above in relation to computing device 100 and power device 130.

FIG. 3 is a block diagram of an example computing device 300 to determine a power course of an inverter 350. In some examples, inverter 350 may be a high voltage inverter that may handle 5000 Watts. The engines 301, 302, and 303 execute at least one computer instructions described herein.

Each of engines 301, 302, 303, and any other engines may be any combination of hardware (e.g., a processor such as an integrated circuit or other circuitry) and software (e.g. machine or processor-executable instructions, commands, or code such as firmware, programming, or object code) to implement the functionalities of the respective engine. Such combinations of hardware and programming may be implemented in a number of different ways. A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, computing device 300 may include additional engines.

Each engine of computing device 300 can include at least one machine-readable storage mediums (for example, more than one) and at least one processing resource (for example, more than one). For example, software that provides the functionality of engines on engine 300 can be stored on a memory of a computer to be executed by a processing resource of the computer. Computing device 300 of FIG. 3, which is described in terms of functional engines containing hardware and software, can include one or more structural or functional aspects of computing device 100 of FIG. 1, which is described in terms of processors and machine-readable storage mediums.

In some examples, and as shown in FIG. 3, computing device 300 includes a current engine 301, an analysis engine 302, and a decision engine 303. Each of these aspects of computing device 300 will be described below. It is appreciated that other engines can be added to computing device 300 for additional or alternative functionality.

Current engine 301 is an engine of computing device 300 that includes a combination of hardware and software that allows computing device 300 to receive a plurality of current values associated with inverter 350. In some examples, and as discussed above in relation to instructions 111, the plurality of current values may include a first current value associated with a first time point and a second current value associated with a second time point. In the example of FIG. 3, current engine 301 interfaces with an inverter. Because an inverter may output positive and negative currents, current engine 301 may also allow computing device to determine an absolute value of the current values received from inverter 350. Additionally, as discussed above in relation to instructions 111, a time period for which current values are received by current engine 301 may be based on rates determined by analysis engine 302.

Current engine 301 also allows computing device 300 to determine at the occurrence of a spike situation based on the received current values of current engine 301. It may do this by evaluating if the received current values are higher than an operational current value of inverter 350, as discussed above.

Analysis engine 302 is an engine of computing device 300 that includes a combination of hardware and software that allows computing device 300 to determine at least one current change value associated with the spike situation. The current change value may describe a rate of change with regard to current values associated with two adjacent time points. In some examples, analysis engine 302 may determine current change values for all adjacent time points for which current values are received by current engine 301.

Analysis engine 302 may also allow computing device 300 to determine a total number of spikes in the spike situation. For example, analysis engine 302 may include a memory that stores and updates a tally of the number of instances in a spike situation that a rate of change is equal to zero. Thus, when analysis engine 302 determines that a rate of change is zero, it may also interface with the memory to update the count. Analysis engine 302 may also determine a duration of a spike in a spike situation. The discussion above in relation to instructions 112 and computing a spike duration is also applicable here.

In some examples, analysis engine 302 may also allow computing device 300 to determine a maximum value of a spike in a spike situation. For example, analysis engine 302 may include a memory that associates the current value of adjacent time points where the rate of change between those time points was zero and associate that current value as the maximum current value of a spike.

Decision engine 303 is an engine of computing device 300 that includes a combination of hardware and software that allows computing device 300 to determine a power course for inverter 350 based on the determinations made by analysis engine 302. The discussion of power course in relation to instructions 113 above is also applicable here.

Decision engine 303 may also interface with current engine 301 to control the specific time period current engine 301 receives current values. For example, decision engine 303 may determine that a rate of change (determined by analysis engine 302) is higher than the threshold rate, and the time that the threshold rate has persisted is equal to or higher than the threshold time. Decision engine 303 may communicate with current engine 301 so current engine 301 may stop receiving current values from inverter 350. As another example, decision engine 303 may determine that a rate of change is lower than the threshold value. Decision engine 303 may tell current engine 301 to continue to receive current values from inverter 350. The discussion above in relation to the specific time period in relation to FIG. 2A is applicable here.

In some examples, decision engine 303 may also allow computing device to send a signal to inverter 350 to disconnect inverter 350 from a power supply when decision engine 303 determines a power course.

FIG. 4 is a block diagram of an inverter 400 supplying currents to multiple loads 450A, 450B, and 450C. Although FIG. 4 shows inverter 400 interfacing with a certain number of loads, other amounts of loads may be used (e.g., one load connected to inverter 400, two loads connected to inverter 400, etc.). A load may include any information technology resource, including but not limited to, computing devices (e.g. switches), storage devices (e.g., solid-state drives, etc.), power devices (such as power converters, etc.), etc. In some examples, inverter 400 may be used in a direct current rack to convert the supplied direct current to devices on the rack that rely on alternate current input (e.g., switches, etc.). In some examples, inverter 400 is a high voltage inverter that may handle 5000 Watts. The engines 401, 402, 403, and 404 execute at least one computer instructions described herein.

Each of engines 401, 402, 403, 404, and any other engines may be any combination of hardware (e.g., a processor such as an integrated circuit or other circuitry) and software (e.g. machine or processor-executable instructions, commands, or code such as firmware, programming, or object code) to implement the functionalities of the respective engine. Such combinations of hardware and programming may be implemented in a number of different ways. A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "engine" is intended to mean at least one engine or a combination of engines. In some examples, computing device 400 may include additional engines that are not shown, for example an inverter engine that allows computing device to provide the functionalities of an inverter.

Each engine of computing device 400 can include at least one machine-readable storage mediums (for example, more than one) and at least one processing resource (for example, more than one). For example, software that provides the functionality of engines can be stored on a memory of a computer to be executed by a processing resource of the computer. Inverter 400 of FIG. 3, which is described in terms of functional engines containing hardware and software, can include one or more structural or functional aspects of computing device 100 of FIG. 1, which is described in terms of processors and machine-readable storage mediums.

In some examples, and as shown in FIG. 4, inverter 400 includes a current engine 401, an analysis engine 402, a decision engine 403, and an execution engine 404. Each of these aspects of inverter 400 will be described below. It is appreciated that other engines can be added to inverter 400 for additional or alternative functionality.

Current detection engine 401 is an engine of inverter 400 that includes a combination of hardware and software that allows inverter 400 to detect a current drawn by loads 450A, 450B, and 450C. In some examples, current detection engine 401 may include a current transformer or a current sense resistor. In some examples, current detection engine 401 may store the values in a memory associated with inverter 400. The values may be stored in a manner that is associated with a time point.

In some examples, current detection engine may allow inverter 400 to determine a current spike situation based on the detected currents. In some examples, this may be achieved by comparing a detected current value to a baseline operational current value of inverter 400. In some examples, the time period for which current detection engine 401 detects currents is varied and influenced by the determinations of decision engine 403. This is similar to the interaction between current engine 301 and decision engine 303 and the description above in relation to this interaction is also applicable here.

Analysis engine 402 is an engine of inverter 400 that includes a combination of hardware and software that allows inverter 400 to determine a current change value that describes a rate of change of the spike situation. Analysis engine 402 also allows inverter 400 to determine a total number of spikes in a current spike situation, to determine a duration of a spike in a current spike situation, and to determine a maximum current of a spike in a current situation. Thus, analysis engine 402 has similar functionalities as analysis engine 302.

Decision engine 403 is an engine of inverter 400 that includes a combination of hardware and software that allows inverter 400 to determine a power course of inverter 400 based on the determinations of analysis engine 402. Thus, decision engine 403 has similar functionalities as decision engine 303.

Execution engine 404 is an engine of inverter 404 that includes a combination of hardware and software that allows system 400 to execute the power course determination of decision engine 403. This allows inverter 400 to implement the power course determined by decision engine 403. In some examples, execution engine 404 may include circuitry to disconnect inverter 400 from its power source based upon a determination from decision engine 403 that a spike situation is caused by a short circuit or an overcurrent for which protective mechanisms should be taken.

Figure 5:
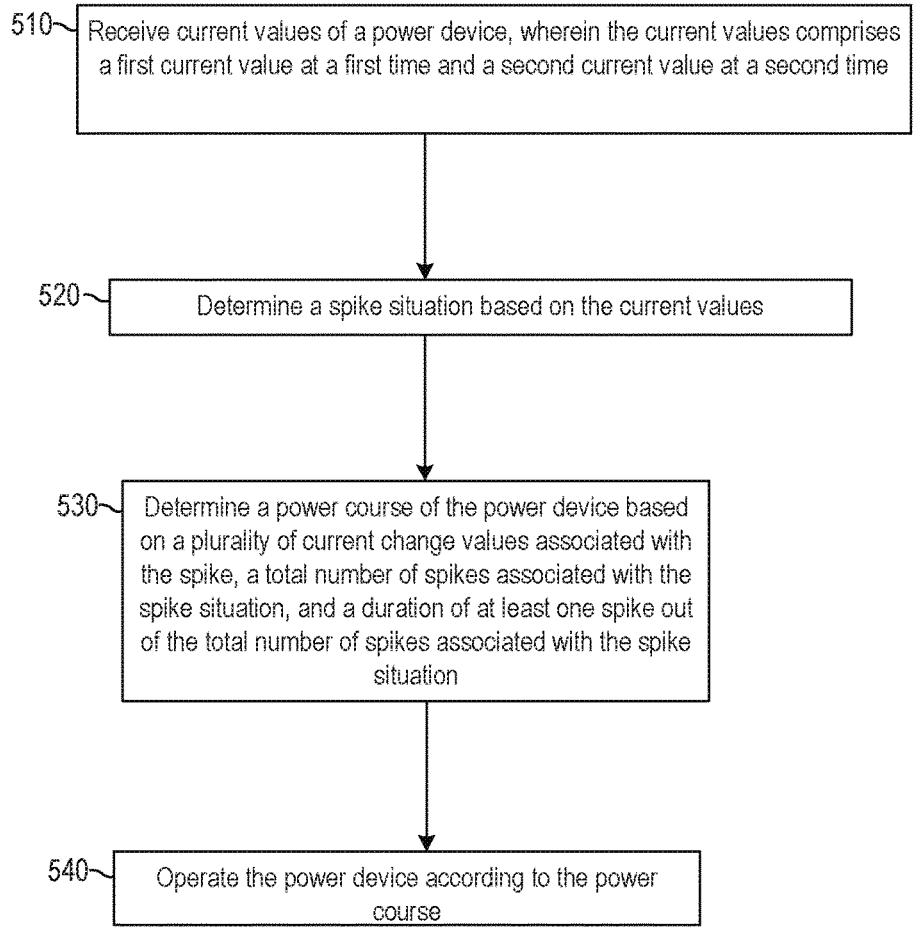
FIG. 5 is a flowchart of an example method of determining a power course based on values calculated from a current change rates, according to some examples.

FIG. 5 illustrates a flowchart for a method 500 to determine a power course for a computing device. Although execution of method 500 is described below with reference to computing device 300, other suitable systems for execution of method 500 may be utilized (e.g., computing device 100 or inverter 400). Additionally, implementation of method 500 is not limited to such examples and it is appreciated that method 500 can be used for any suitable device or system described herein or otherwise.

At 510 of method 500, current engine 301 of computing device 300 may receive a plurality of current values associated with inverter 350. In some examples, the plurality of current values may comprise a first current value at a first time and a second current value at a second time. At 520 of method 500, analysis engine 302 may determine a spike situation based on the plurality of current values received in 510. At 530 of method 500, decision engine 303 may determine a power course of the computing device based on a plurality of current change values, a total number of spikes associated with the current spike situation, and a duration of a spike out of the total number of spikes. At 540 of method 500, decision engine 303 of computing device 300 may send a signal to inverter 350 to operate according to the power course determined at 530. This signal may be a signal to trigger inverter 350 to disconnect itself from a power supply input. Additionally, this signal may also be to continue operating without any changes (in other words ignoring the spike situation).

Although the flowchart of FIG. 5 shows a specific order of performance of certain functionalities, method 500 is not limited to that order. Additionally, although flowchart of FIG. 5 shows certain functionalities as occurring in one step, the functionalities of one step may be completed in multiple steps.

Figure 6A:
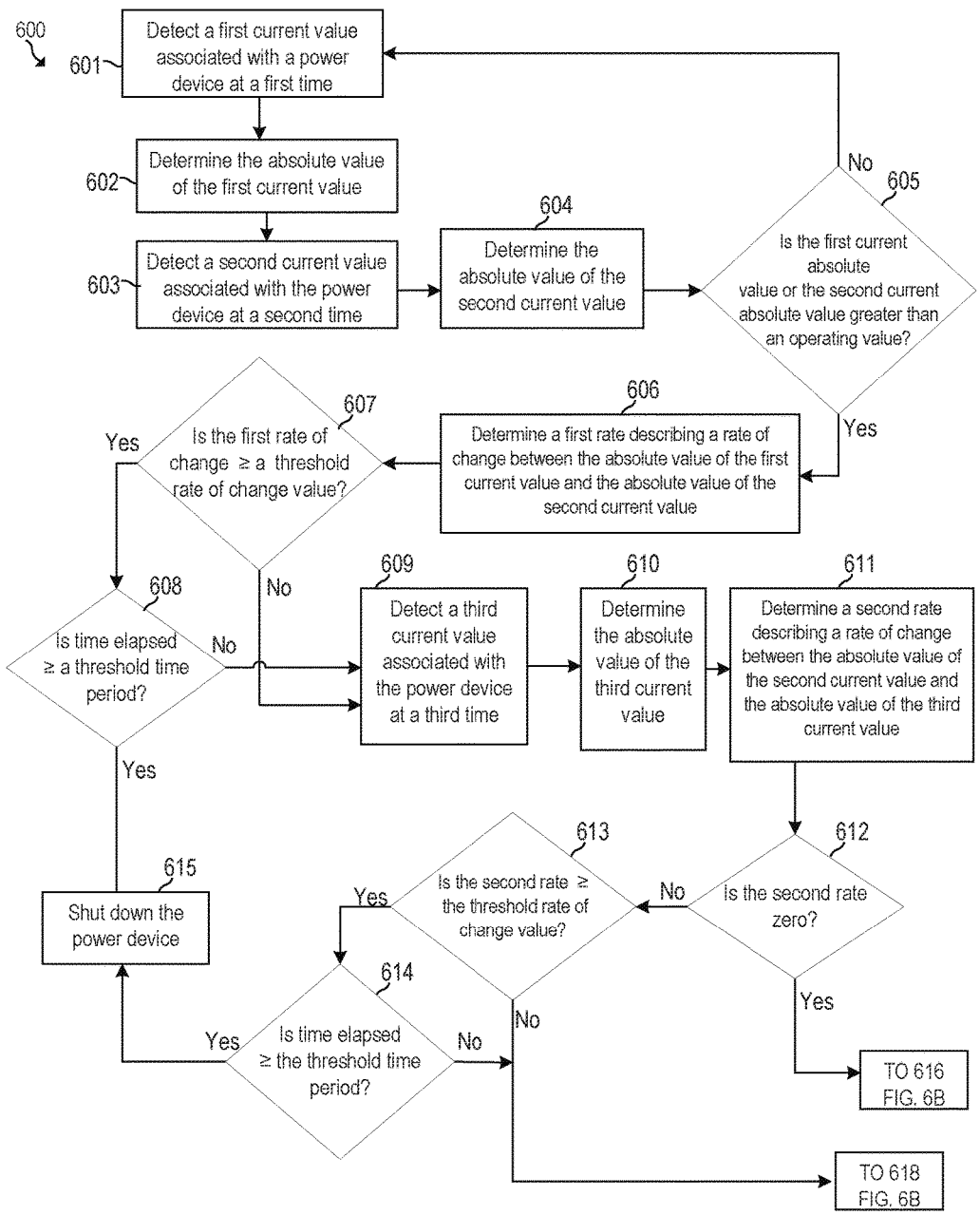
FIG. 6A is the first part of a flowchart of an example method of detecting and analyzing current values in a spike of a current spike situation, according to some examples.
Figure 6B:
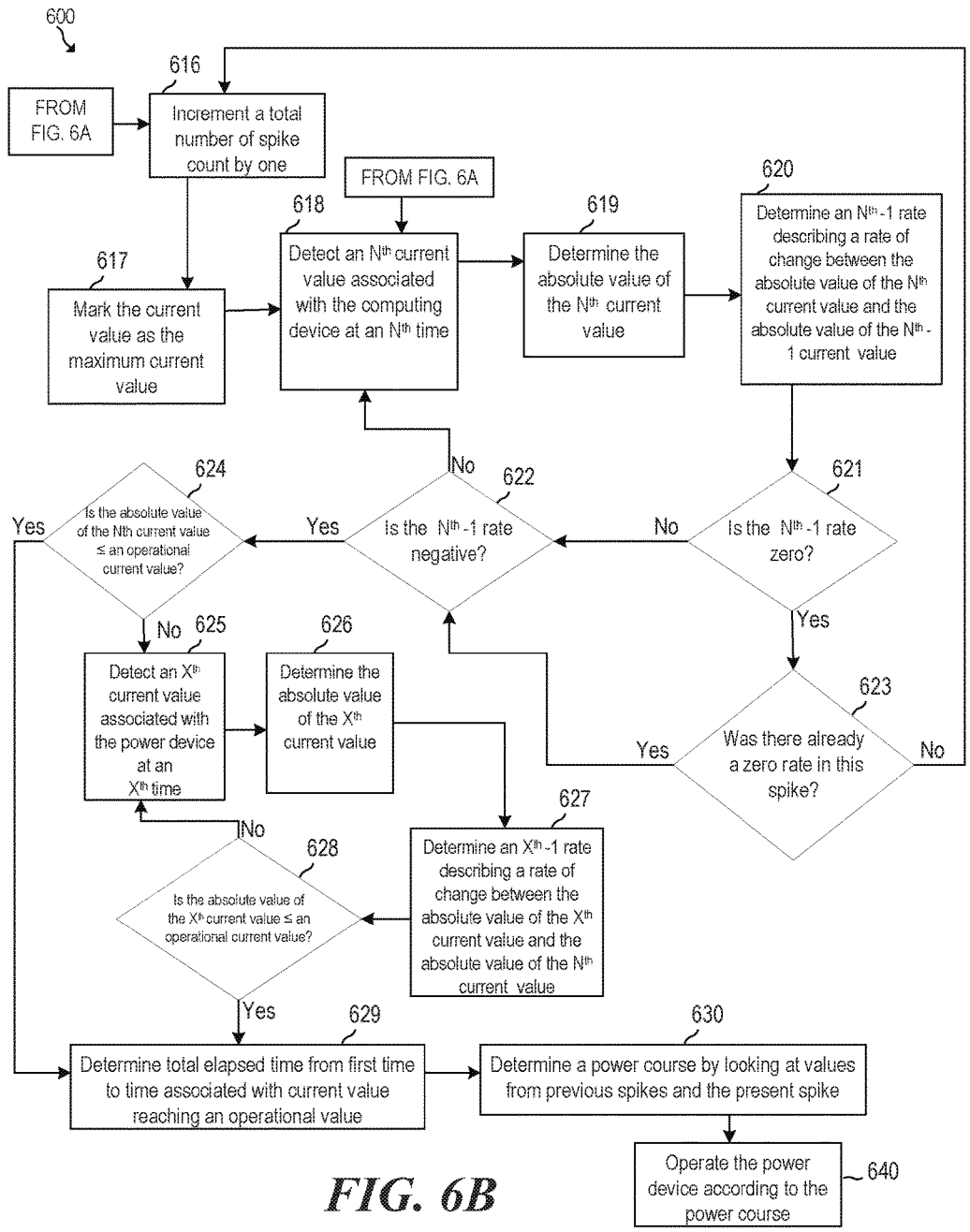
FIG. 6B is the second part of the flow chart shown in FIG. 6A.

FIGS. 6A and 6B illustrate a flowchart for a method 600 to determine the characteristics of one spike in a spike situation. Although execution of method 600 is described below with reference to inverter 400, other suitable systems for execution of method 600 may be utilized (e.g., computing device 100 or computing device 300). Additionally, implementation of method 600 is not limited to such examples and method 600 may be used for any suitable device or system described herein or otherwise.

At 601 of method 600, current detection engine 301 detects a first current value associated with inverter 400 at a first time. At 602 of method 600, current detection engine 301 determines the absolute value of the first current value. At 603, current detection engine 301 detects a second current value associated with inverter 400 at a second time. At 604, current detection engine 301 determines the absolute value of the second current value detected at 603. At 605, current detection engine 301 may determine the occurrence of a spike situation by comparing the absolute value of the first current or the absolute value of the second current value to an operating current value of inverter 400. As discussed above in relation to instructions 111, an operating current value of the inverter may be based on data of current outputted by inverter 400 in the past. Responsive to a determination that the absolute values of either the first current value or the second current value is greater than the operating value, method 600 proceeds to 606. Responsive to a determination that the absolute values are not greater than the operating value, method 600 iterates back to 601.

At 606 of method 600, analysis engine 402 of inverter 400 determines a first rate of change that describes a rate of change between the absolute value of the first current value and the absolute value of the second current value. In some examples, and as discussed above, the first rate may represent the change in current with regards to time. At 607 of method 600, decision engine 403 of inverter 400 determines if the first rate determined at 606 is greater than or equal to a threshold rate. In some examples, this threshold rate may be associated with a rate of current change seen in a short circuit situation (e.g., 100 amps/microseconds, 400 amps/microseconds, etc.) The threshold rate may vary depending on the number of devices connected to inverter 400 and the loads that inverter 400 supports. The discussion above in relation to threshold rate is applicable here.

Responsive to a determination that the first rate is greater than or equal to the threshold rate, method 600 proceeds to 608. At 608, decision engine 404 of inverter 400 determines the elapsed time between the first time and the second time. Responsive to a determination that the elapsed time between the first time and the second time is greater than or equal to a threshold time, decision engine 404 determines, based on the first rate and the threshold time period, a power course to shut down the inverter 400. Method 600 then proceeds to 615 where execution engine 404 of inverter 400 shuts down inverter 400.

Responsive to a determination that the elapsed time between the first time and the second time is less than the threshold time, decision engine 404 decides a power course of continuing operations of the inverter 400 (thus continuing to detect currents and analyze rates). Method 600 proceeds to 609. In some examples, and as discussed above, the threshold time may be based on an amount of time the inverter 400 may withstand high current levels. While the threshold time may vary depending on the inverter 400, in some examples, the threshold time may be equal to ten microseconds.

At 609 of method 600, current detection engine 301 of inverter 400 detects a third current value at a third time. At 610 of method 600, current detection engine 401 may determine the absolute value of the third current value detected at 610. At 611 of method 600, analysis engine 302 determines a second rate of change describing a rate of change between the absolute value of the second current value and the absolute value of the third current value. At 612 of method 600, analysis engine 402 determines if the second rate is zero. A determination that the second rate is zero may indicate that the spike determined at 605 has reached its maximum current and will be decreasing in current in subsequent time points following the third time. Thus, method 600 proceeds to 616 to track that a maximum current has been reached.

A determination that the second rate is not zero may indicate that the spike determined at 605 of method 600 is still rising. Thus, method 600 proceeds to 613. At 613, decision engine 403 determines if the second rate is equal to or greater than the threshold rate as was used at 607. Responsive to a determination that the second rate is equal to or greater than the threshold rate, method 600 proceeds to 614. Responsive to a determination that the second rate is not equal to or greater than the threshold rate, method 600 proceeds to 618.

At 614 of method 600, decision engine 403 determines if a total time in which rates with values of equal to or higher than the threshold rate is equal to or greater than the threshold time. While the threshold time used at 614 is similar to the threshold time used in 608, the calculation of the time elapsed may be different between 608 and 614. At 608, decision engine 403 determines the time elapsed between the first time and the second time. At 614, however, decision engine 403 determines a total time that is associated with rates having a value that is greater than or equal to the threshold change value. For example, responsive to a determination that the first rate is equal to or higher than the threshold rate, at 614, decision engine 403 determines a total time by looking at the time elapsed between the first time and the third time (because both the first rate and the second rate are equal to or greater than the threshold rate of change value). However, responsive to a determination that the first rate is not equal to or greater than the threshold rate of change value, at 614 decision engine 403 determines a total time by looking at the time elapsed between the second time and the third time. In other words, at 614, decision engine 403 determines a time elapsed value that represents a period of time in which the rates of change determined were equal to or higher than the threshold rate of change value. Thus, the time elapsed represents a continuous period of time where the rates are equal to or higher than the threshold rate.

Responsive to a determination that the time elapsed is greater than or equal to the threshold time period, decision engine 403 determines a power course to shut down inverter 400 and method 600 proceeds to 615.

Responsive to a determination that the time elapsed is not equal to or greater than the threshold time period, method 600 proceeds to 618.

At 616 of method 600, analysis engine 402 of inverter increases a count kept by inverter 400 by one to indicate that a spike has occurred. As discussed above, this count data may be stored in a memory associated with analysis engine 402. At 617 of method 600, analysis engine 402 of inverter marks the current value that is associated with the second rate as the maximum current value. This maximum current data may also be stored in a memory associated with analysis engine 402. The manner in which the current data is stored links it to the specific spike (for example, referring to FIG. 2C, the maximum current value at point B of spike S2 would be stored as being linked to spike S2).

At 618 of method 600, current detection engine 401 detects an Nth current value associated with the inverter at an $N^{th}$ time. As used herein, $N^{th}$ is a loop counter that may include any subsequent number of current values that are detected after the third current value before method 600 proceeds to 624.

For example, $N^{th}$ may represent a fourth current value that is detected. In examples where $N^{th}$ represents a fourth current value, at 619, current detection engine 401 determines the absolute value of the fourth current value. At 620, analysis engine 402 determines a third rate (i.e., the $N^{th}-1$ rate) describing a rate of change between the absolute value of the fourth current value and the absolute value of the third current value (i.e., the $N^{th}-1$ current value). At 621, analysis engine 621 determines if the third rate is equal to zero. Responsive to a determination that the third rate is equal to zero, method 600 proceeds to 623, where analysis engine 621 determines if there is already a rate associated with the present spike that was zero. This may occur when the current in inverter 400 reaches a value and stays at that value for a time period that exceeds the sample rate of current detection engine 401. For example, if the current remains at a value of X for 5 microseconds and the sampling rate for the current detection engine 401 is 2 microseconds, two rates associated with the present spike will be zero. If the first instance of a zero rate was already reflected in the spike count data, then the second of a zero rate does not affect the spike count data (as doing so may inaccurately inflate the number of spikes that are associated with spike situation). Thus, method 600 proceeds to 622 and does not increment a total number of spike count by one, as is done at 616. Responsive to a determination that a spike has not been reflected in the current data, then method 600 iterates to 616 to increase the spike count data by one.

At 622, analysis engine 602 determines if the third rate is negative. Because a negative rate may indicate that the present spike determined at 605 is on its way down (e.g., decreasing), method 600 proceeds to 624-628. During 624-628, inverter 400 is detecting current values and determining rates, but is also determining an end of the present spike. Thus, at 624, analysis engine 402 determines if the absolute value of the current value is equal to or below the operational current value. In some examples, the operational current value used at 624 is the same operational current value used at 605. Responsive to a determination that the absolute value is equal to or below the operational current value, method 600 proceeds to 629, described herein.

Responsive to a determination that the $N^{th}$ current value is not equal to or less than the operational current value, method 600 proceeds to 625. At 625, current detection engine 401 of inverter 400 detects an $X^{th}$ current value at an $X^{th}$ time. For the example discussed above where $N^{th}$ represents a fourth current value, $X^{th}$ may represent a fifth current value.

At 626, current detection engine 401 of inverter 400 determines the absolute value of the fifth current value ($X^{th}$ current value). At 627, analysis engine 402 of inverter 400 determines a fourth rate ($X^{th}$–1) describing a rate of change between the absolute value of the fourth current value and the absolute value of the fifth current value. At 628, analysis engine 402 determines if the absolute value of the fifth current value is equal to or less than the operational current value. This is similar to the comparison done in 624. If the fifth current value is, method 600 proceeds to 629. If it is not, method 600 iterates back to 625 to detect additional current values.

Thus, 618, 619, 620, 621, 622 of method 600 represents a loop of method 600 that may be repeated inverter 400 until the conditions of 622 are met. In the example above, at the fourth current value, analysis engine 402 determined at 622 that the third rate (describing a rate of change between the fourth current value and the third current value) was negative. However, in other examples, analysis engine 402 may determine at 622 that the third rate is not negative. Thus, method 600 does not proceed to 624 but instead iterates back to 618 to detect another current at another time period, where N is now the fifth current value detected at the fifth time. If, during this iteration, analysis engine determines that the fourth rate (describing a change between the fifth current value and the fourth current value) is negative, method 600 does not iterate back to 618 but instead proceeds to 624 and 625 subsequently. At 625, current detection detects a sixth current value at a sixth time (instead of a fifth current value at a fifth time and X is 6 instead of five). Thus, $N^{th}$ may be characterized as a counter that represents a number of iterations through which method 600 goes through 618, 619, 620, 621, and 622 before proceeding to 624.

Similarly, 624, 625, 626, 627, 628 represents a second loop of method 600 that may be repeated by inverter 400 until the conditions of 628 are met. Accordingly, $X^{th}$ may also be characterized as a counter that represents a number of iterations through which method 600 goes through 624, 625, 626, 627, and 628. While $X^{th}$ may start off (in the first iteration) as being equal to $N^{th}$+1, this may change with the addition of more iterations of 624-628.

At 629, analysis engine 402 determines the total elapsed time from the first time to the time point where the absolute current value is equal to the operation value. This may be the duration of the spike. At 630, decision engine 403 determines a power course by looking at values from previous spikes and the present spike in the current spike situation. In some examples, the amount of previous spikes decision engine 403 relies upon is based on a set period of time (e.g., decision engine 403 looks back at spikes that occurred in the past 1 second before the occurrence of the present spike, etc.) In some examples, the amount of previous spikes decision engine 403 relies upon is tied to the power cycle of inverter 400 (e.g., decision engine 403 looks back at spikes that occurred during this power cycle of inverter 400, etc.) At 640, execution engine 404 operates the inverter 400 according to the power course.

Although the flowchart of FIG. 6A and FIG. 6B shows a specific order of performance of certain functionalities, method 600 is not limited to that order. For example, some of the functionalities shown in succession in the flowchart may be performed in a different order, may be executed concurrently or with partial concurrence, or a combination thereof, unless the context of the function of the step is contrary to that interpretation.

All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is;:

1. A method comprising:
    receiving current values of a power device, wherein the current values comprise a first current value at a first time, and a second current value at a second time;
    determining a spike situation of the power device;
    determining a power course for the power device based on a plurality of current change values associated with the spike situation, a total number of spikes associated with the spike situation, and a duration of at least one spike out of the total number of spikes associated with the spike situation; and
    operating the power device according to the power course.

2. The method of claim 1, wherein the determining of the current condition is based on a maximum current value associated with the spike situation.

3. The method of claim 1, wherein the power course is shutting down the power device.

4. The method of claim 1, wherein the power course is ignoring the spike situation.

5. The method of claim 1, wherein the power device is a high voltage inverter.

6. The method of claim 1, wherein the determining of the spike situation comprises comparing the first current value to an operational current value associated with the power device.

7. The method of claim 1, wherein the plurality of current change values includes a first current change value describing a change in current between the first current value and the second current value with regard to time.

8. The method of claim 2, wherein the plurality of current change values include a number of change values indicating no change, and the total number of current spikes is equal to the number of change values indicating no change.

9. A non-transitory machine-readable storage medium comprising a processing resources instructions executable by a processing resource to:
    receive a plurality of current values associated with a plurality of time points in a time period, the plurality of current values associated with a power device and comprising a first current value associated with a first time point, and a second current value associated with a second time point subsequent to the first time point;
    determine a plurality of rates, each rate describing a rate of change between current values associated with adjacent time points, the plurality of rates comprising first rate describing a rate of change between the first time point and the second time point, wherein the time period is based on the first rate;
    determine a power course of the power device based on the first rate; and
    implement the power course.

10. The non-transitory machine-readable storage medium of claim 9, wherein the time period is further based on a number of rates out of the plurality of rates being equal to or higher than the first rate.

11. The non-transitory machine-readable storage medium of claim 10, wherein a total time associated with the first rate and the number of rates is equal to or less than ten microseconds.

12. The non-transitory machine-readable storage medium of claim 9, comprising instructions to determine a total number of current spikes occurring in the time period, wherein the determination of the power course is based on the total number of current spikes.

13. The non-transitory machine-readable storage medium of claim 12, wherein the plurality of rates includes a number of rates indicating a change rate of zero, and the total number of current spikes is equal to the number of rates indicating a change rate of zero.

14. The non-transitory machine-readable storage medium of claim 12, comprising instructions to determine a duration of at least one current spike of the total number of current spikes, wherein the determination of the current condition is based on the duration.

15. The non-transitory machine-readable storage medium of claim 9, wherein the power course comprises powering off the power device.

16. A computing device comprising:
   a current detection engine to detect a spike situation of the computing device;
   an analysis engine to:
      determine at least one current change value describing a rate of change of the spike situation;
      determine a total number of current spikes in the spike situation; and
      determine a duration of at least one spike out of the total number of spikes;
   a decision engine to determine a power course based on the at least one current change value, the total number of spikes, and the duration of at the least one spike; and
   an execution engine to power off the computing device based on the power course.

17. The computing device of claim 16, wherein the decision engine is to determine the power course based on a maximum current value associated with the spike situation.

18. The computing device of claim 6, wherein the computing device is an inverter.

19. The computing device of claim 16, wherein the current detection engine is to detect a first current value at a first time point, and detect a second current value at a second time point, wherein the current detection engine is to compare the first current value an operational current value to determine the spike situation.

20. The computing device of claim 16, wherein the current detection engine is to detect a spike situation of the computing device for a period of time, wherein the period of time is based on the at least one current change value.

* * * * *